United States Patent
Ohkubo

(10) Patent No.: US 10,735,613 B2
(45) Date of Patent: Aug. 4, 2020

(54) LIGHT SCANNING DEVICE AND IMAGE FORMING APPARATUS

(71) Applicant: SHARP KABUSHIKI KAISHA, Sakai, Osaka (JP)

(72) Inventor: Kenzo Ohkubo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/216,931

(22) Filed: Dec. 11, 2018

(65) Prior Publication Data
US 2019/0199881 A1    Jun. 27, 2019

(30) Foreign Application Priority Data
Dec. 25, 2017   (JP) .................................. 2017-247868

(51) Int. Cl.
*H04N 1/04* (2006.01)
*H04N 1/00* (2006.01)
*H04N 1/028* (2006.01)

(52) U.S. Cl.
CPC ..... *H04N 1/00909* (2013.01); *H04N 1/00519* (2013.01); *H04N 1/00976* (2013.01); *H04N 1/0283* (2013.01)

(58) Field of Classification Search
CPC ........... H04N 1/00909; H04N 1/00519; H04N 1/00976; H04N 1/0283
USPC ......................................................... 358/481
See application file for complete search history.

(56) References Cited

U.S. PATENT DOCUMENTS

2018/0231769 A1*  8/2018  Aruga .................. G02B 26/123

FOREIGN PATENT DOCUMENTS

JP          H0634901 A       2/1994

* cited by examiner

*Primary Examiner* — Cheukfan Lee
(74) *Attorney, Agent, or Firm* — ScienBiziP, P.C.

(57) ABSTRACT

In a light scanning device, a substrate equipped with a polygonal mirror is disposed astride an interior section and an exposed section of a housing. The substrate is provided with a separator that comes into contact with a front face thereof. The separator separates the substrate into a first region disposed in the interior section and a second region disposed in the exposed section. The polygonal mirror is provided in the second region of the substrate.

9 Claims, 5 Drawing Sheets

LIGHT SCANNING DEVICE AND IMAGE FORMING APPARATUS

BACKGROUND

1. Field

The present disclosure relates to light scanning devices and image forming apparatuses equipped with the same.

2. Description of the Related Art

Image forming apparatuses, such as digital multifunction apparatuses, laser printers, or facsimile apparatuses, are equipped with light scanning devices light scanning device of this type is known to use a polygonal mirror and causes light emitted from a light source to be reflected at a peripheral surface of the polygonal mirror, which rotates, so as to scan the light in a predetermined direction. In addition to the polygonal mirror, the light scanning device includes a polygonal motor that rotates the polygonal mirror, and also includes a container that accommodates the polygonal mirror and the polygonal motor.

The polygonal motor is supported by an inner partition wall of the container and is covered and protected by a metallic cover. The container has a cutout in a vertical wall of an outer periphery thereof, so that the light scanning device is provided with an opening extending between the inside and the outside. An elastic member is disposed in the cutout, and a connector extends through the elastic member. For example, see Japanese Unexamined Patent Application Publication No. 6-34901.

When the polygonal mirror rotates at high speed in the light scanning device, positive-pressure and negative-pressure regions occur on the mirror faces of the polygonal mirror, causing foreign matter, such as fine dust particles and mist in the air, to adhere to the mirror faces located in the negative-pressure region. When foreign matter adheres to the polygonal mirror, the reflectivity of the contaminated areas decreases. This leads to reduced intensity of a light beam emitted from the light scanning device and deflected by the polygonal mirror, which is problematic in terms of, for example, defective writing onto a photoconductor drum as well as image deterioration on a transfer sheet. Therefore, in a light scanning device, the intrusion of fine dust particles from the outside has to be suppressed as much as possible.

In the light scanning device in the related art, an insertion hole for inserting a connector thereto extends through an elastic member, and the connector is inserted into the container from outside the container via the elastic member. In such a structure in the related art, it is not only difficult to bring the outer peripheral surface of the connector and the elastic member into contact with each other, but the connector insertion hole provided in the elastic member may also deform or form a gap with the connector when the connector is removed or inserted. Therefore, the possibility of intrusion of fine dust particles from the outside is not negligible, and it is conceivable that an additional elastic member has to be provided around the connector after the connector is connected, so as to hermetically seal around the insertion hole.

It is desirable to provide a light scanning device and an image forming apparatus equipped with the same that have increased shielding properties from the outside so as to suppress the intrusion of fine dust particles.

SUMMARY

According to an aspect of: the disclosure, there is provided a light scanning device including a housing and a light deflecting unit that is provided in the housing and that deflects and scans light from a light source. The housing is provided with an interior section that is not exposed to an outside of the housing and an exposed section that is exposed to the outside. The light deflecting unit includes a polygonal mirror and a substrate having a first face on which the polygonal mirror is mounted. The substrate includes a first region that is disposed in the interior section and in which the polygonal mirror is mounted and a second region disposed in the exposed section. A separator that separates the interior section and the exposed section from each other is provided between the first region and the second region of the substrate.

According to another aspect of the disclosure, there is provided an image forming apparatus including the aforementioned light scanning device.

DESCRIPTION OF THE EMBODIMENTS

A light scanning device and an image forming apparatus according to an embodiment of the present disclosure will be described below with reference to the drawings.

Image Forming Apparatus

Figure 1:
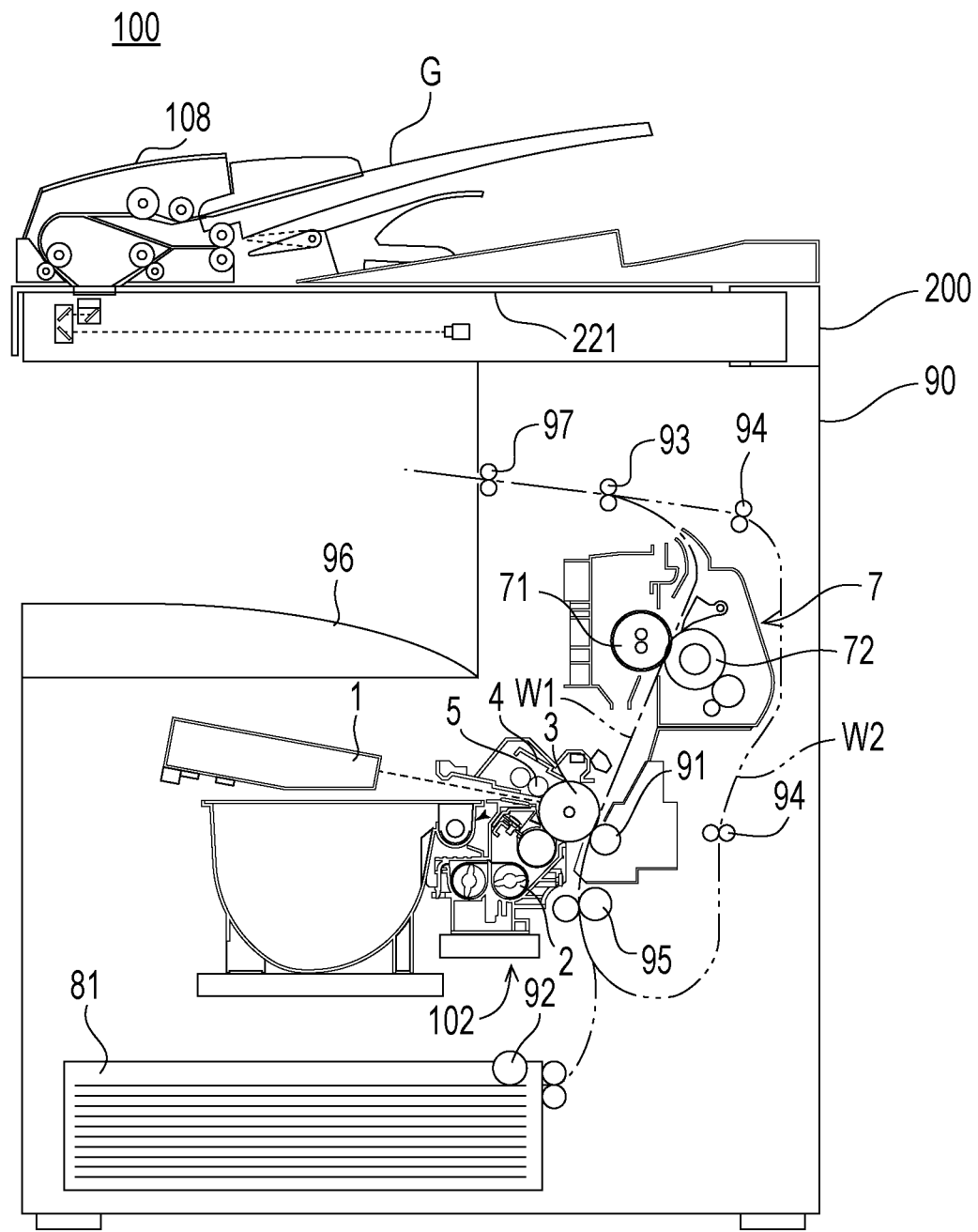
FIG. 1 is a cross-sectional view schematically illustrating an image forming apparatus equipped with a light scanning device according to an embodiment of the present disclosure, as viewed from the front.

FIG. 1 is a cross-sectional view schematically illustrating an image forming apparatus 100 equipped with a light scanning device 1 according to an embodiment, as viewed from the front.

The image forming apparatus 100 according to this embodiment is a monochrome image forming apparatus. The image forming apparatus 100 performs as image forming process in accordance with image data read by an image reading device 200 or image data transmitted from an external unit. Alternatively, the image forming apparatus 100 may be a color image forming apparatus that forms multicolor and monochrome images onto sheets S.

The image forming apparatus 100 includes a document feeding device 108 and an image forming apparatus body 90. The image forming apparatus body 90 is provided with an image forming unit 102 and a sheet conveying system 103.

The image forming unit 102 includes the light scanning device (exposure unit) 1, a developing unit 2, a photoconductor drum 3 functioning as an electrostatic-latent-image bearing member, a cleaning unit 4, a charging unit 5, and a fixing unit 7. The sheet conveying system 103 includes a feed tray 81, a manual feed tray 82, an output tray 96, and an output roller 97.

The image reading device 200 for reading an image of a document G is provided above the image forming apparatus body 90. The image reading device 200 includes a document base 221 on which the document G is placed. The document base 221 is composed of transparent reinforced glass and has a substantially rectangular shape. The document feeding device 108 is provided above the document base 221.

In the image forming apparatus 100, the image of the document. G read by the image reading device 200 is transmitted as image data to the image forming apparatus body 90 where the image is recorded onto a sheet S.

The image forming apparatus body 90 is provided with a sheet conveyance path W1. The feed tray 81 or the manual feed tray 82 feeds a sheet S to the sheet conveyance path W1. The sheet conveyance path W1 guides the sheet S to the output tray 96 via a transfer roller 91 and the fixing unit 7.

The fixing unit 7 thermally fixes a toner image formed on a sheet S onto the sheet S. A pickup roller 92, a conveying roller 93, a registration roller 95, the transfer roller 91, a heating roller 71 and a pressure roller 72 in the fixing unit 7, and the output roller 97 are disposed in the vicinity of the sheet conveyance path W1.

In the image forming apparatus 100, a sheet S fed from the feed tray 81 or the manual feed tray 82 is conveyed to the registration roller 95. Then, the sheet S is conveyed to the transfer roller 91 by the registration roller 95 at a timing at which the sheet S and the toner image on the photoconductor drum 3 are aligned with each other.

The toner image on the photoconductor drum 3 is transferred onto the sheet S by the transfer roller 91. Subsequently, the sheet S travels through the heating roller 71 and the pressure roller 72 in the fixing unit 7 and is then output onto the output tray 96 via the conveying roller 93 and the output roller 97.

If an image is to be formed onto the rear face of the sheet S in addition to the front face thereof, the sheet S is conveyed in the reverse direction to an inversion sheet conveyance path W2 from the output roller 97. The sheet S is inverted by traveling through an inversion conveying roller 94 so as to be guided again to the registration roller 95. Then, similar to the front face of the sheet S, the rear face thereof undergoes a toner-image forming process and a toner-image fixing process. The sheet S is subsequently output toward the output tray 96.

Light Scanning Device

Next, the light scanning device 1 provided in the image forming apparatus 100 will be described.

Figure 2:
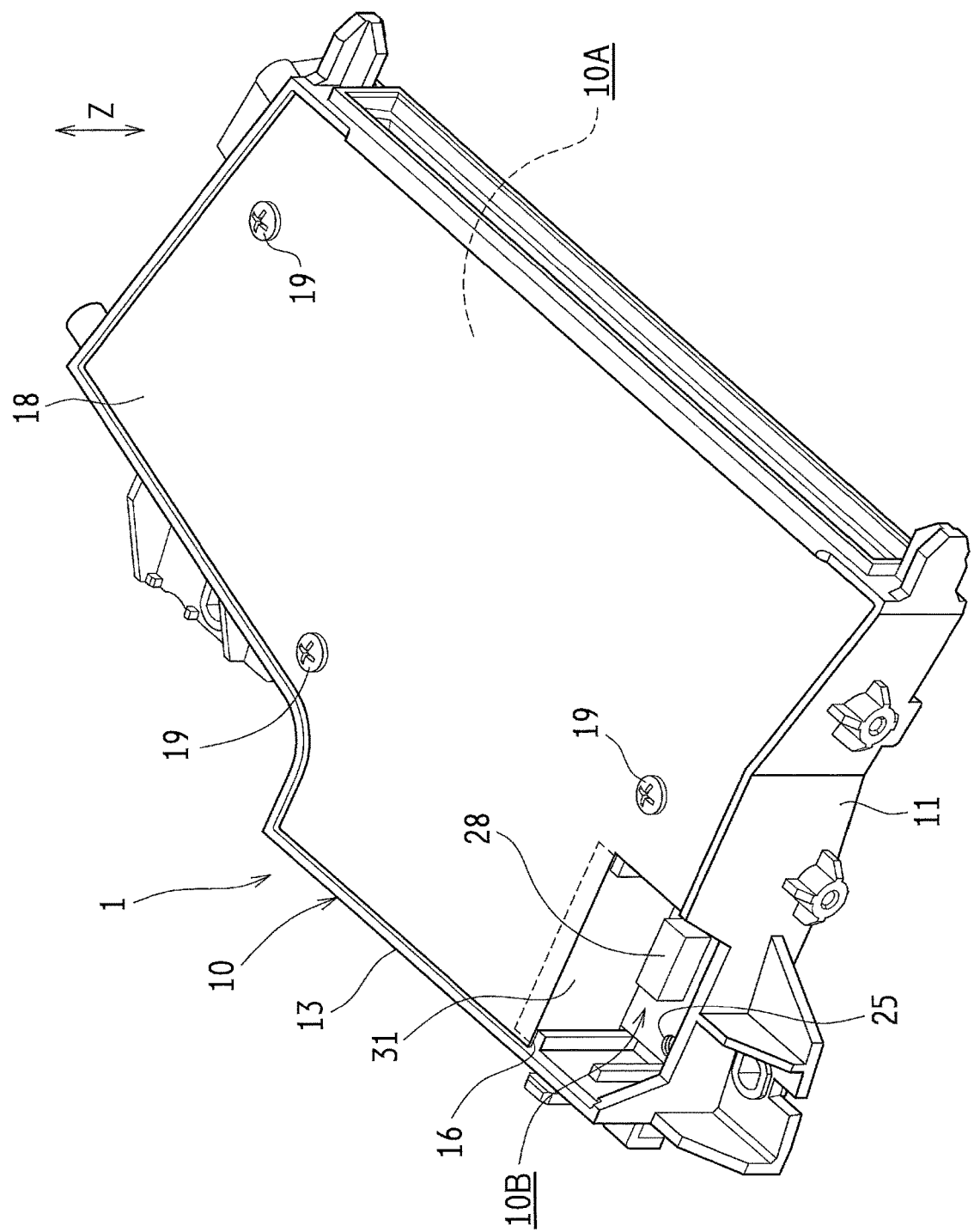
FIG. 2 is a perspective view of the light scanning device according to the embodiment.
Figure 3:
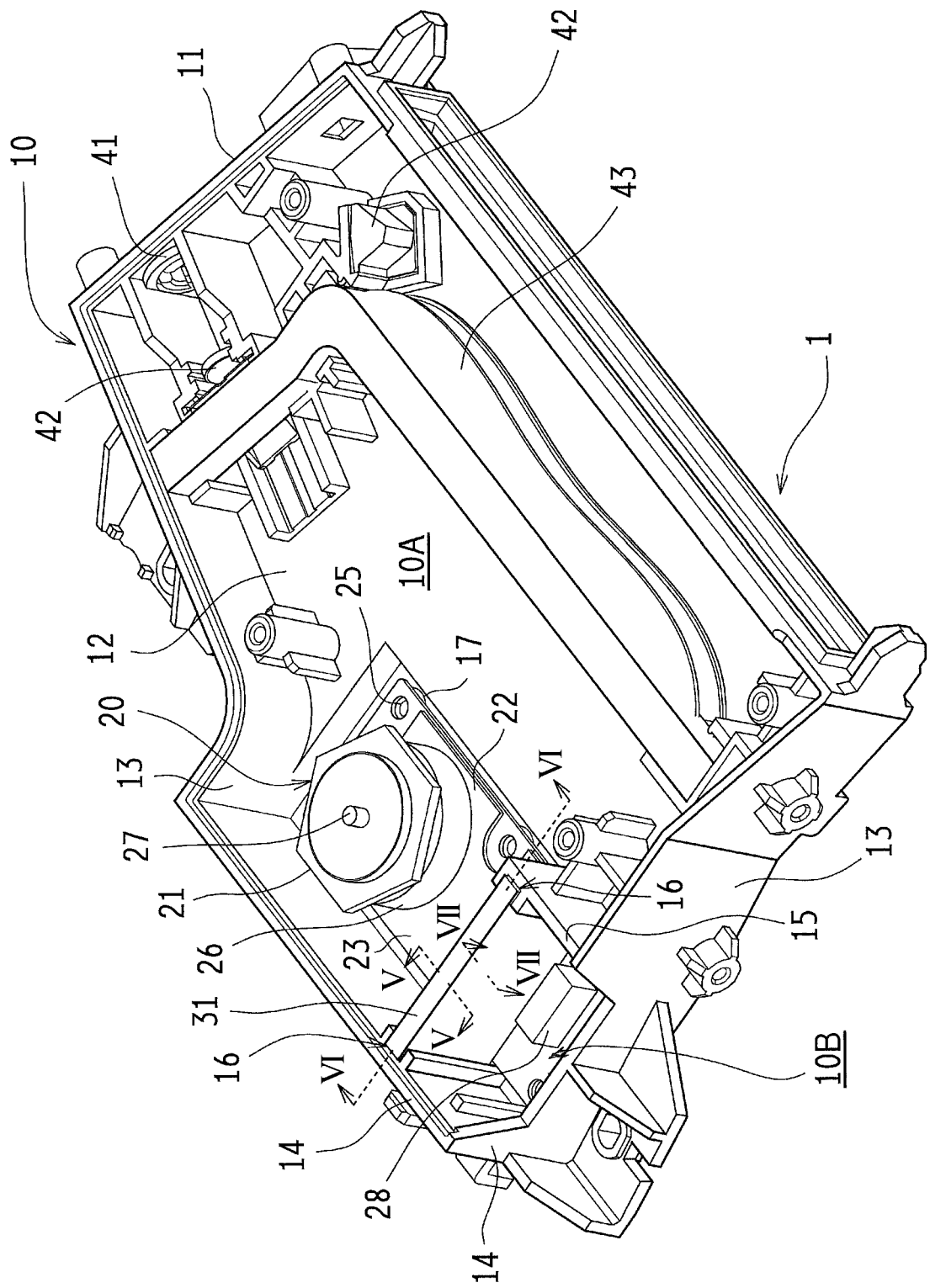
FIG. 3 is a perspective view illustrating a housing from which a cover member is removed in the light scanning device.
Figure 4:
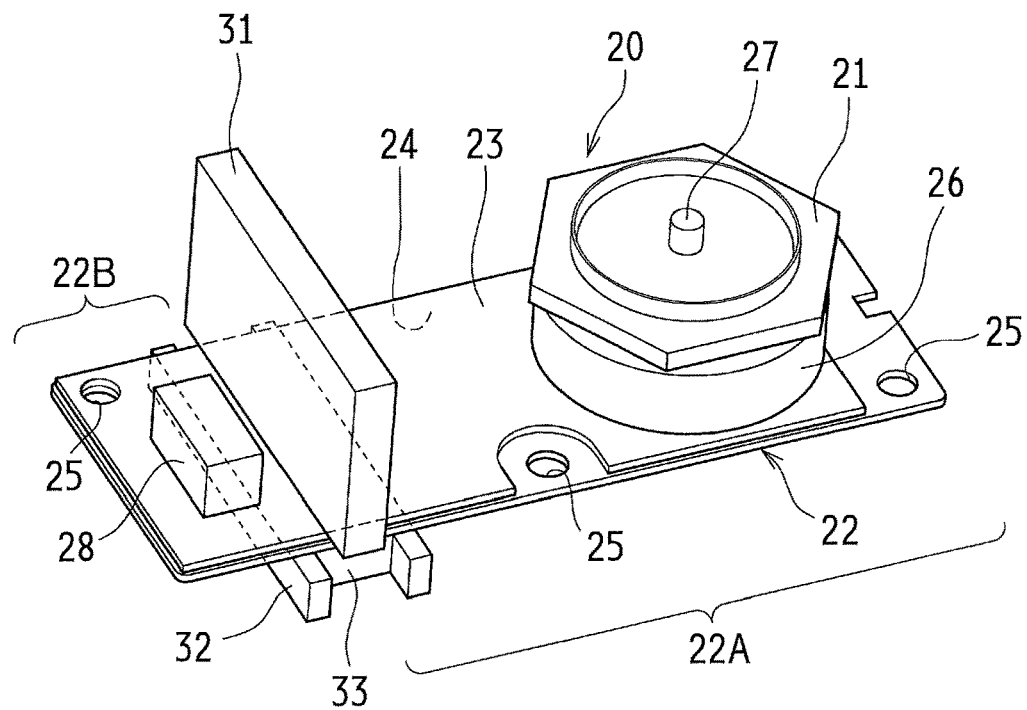
FIG. 4 is a perspective view illustrating an example of a light deflecting unit provided in the light scanning device.
Figure 5:
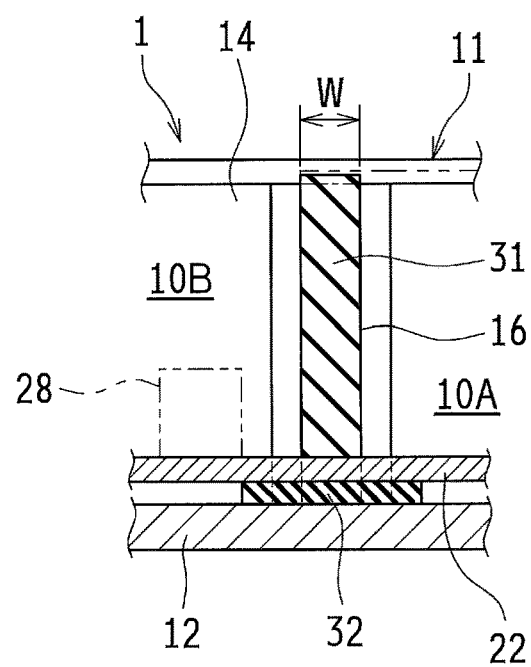
FIG. 5 is a cross-sectional view taken along line V-V in FIG. 3.
Figure 6:
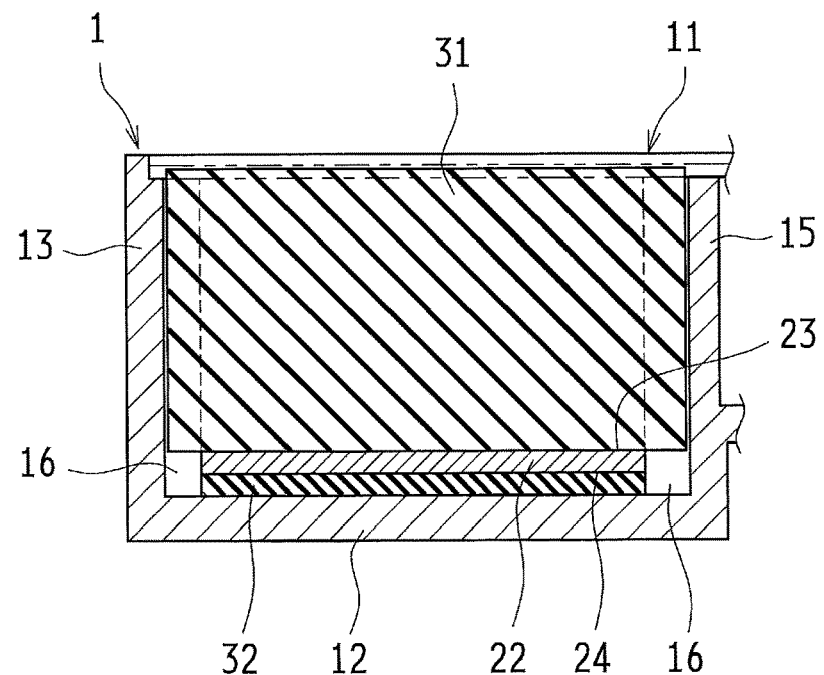
FIG. 6 is a cross-sectional view taken along line VI-VI in FIG. 3.
Figure 7:
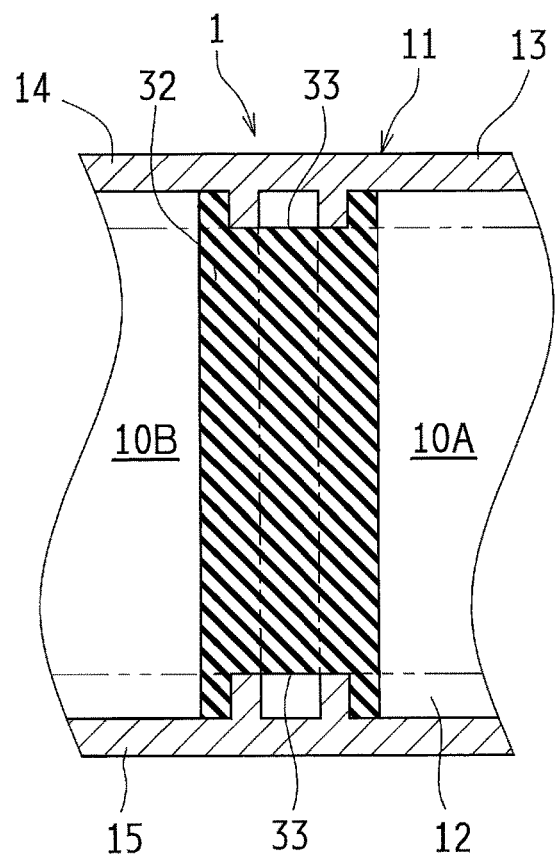
FIG. 7 is a cross-sectional view taken along line VII-VII in FIG. 2.

FIGS. 2 to 7 illustrate the light scanning device 1 according to this embodiment. Specifically, FIG. 2 is an external perspective view of the light scanning device 1, FIG. 3 is a perspective view illustrating a housing from which a cover member is removed, and FIG. 4 is a perspective view illustrating an example of a light deflecting unit 20 in the light scanning device 1. FIG. 5 is a cross-sectional view taken along line V-V in FIG. 3, FIG. 6 is a cross-sectional view taken along line VI-VI in FIG. 3, and FIG. 7 is a cross-sectional view taken along line VII-VII in FIG. 3. In FIG. 2, an arrow Z indicates the vertical direction in the light scanning device 1.

The light scanning device 1 functions as a laser scanning unit (LSU), and the light deflecting unit 20 that deflects and scans a laser beam is provided in a housing 10.

As illustrated in FIG. 2, the housing 10 accommodates components of the light scanning device 1 and includes a substantially-box-shaped housing body 11 with an upper opening and a closed bottom and a cover member 18 that covers the housing body 11. An elastic seal member, such as a foam member (not illustrated), is fitted where the housing body 11 and the cover member 18 are in contact with each other. The cover member 18 and the housing body 11 are joined to each other in a state where the seal member is pressed by snap fitting or by using fasteners 19, such as screws.

As illustrated in FIG. 3, the light deflecting unit 20 disposed in the housing 10 includes optical elements, such as a polygonal mirror 21 that scans a laser beam and a lens 42 for guiding the laser beam reflected by the polygonal mirror 21 toward the photoconductor drum 3. In this embodiment, the light deflecting unit 20 includes the polygonal mirror 21, a substrate 22 on which the polygonal mirror 21 is mounted, a polygonal motor 26 that rotationally drives the polygonal mirror 21, and a connector 28 that receives a control signal for controlling the polygonal mirror 21.

The polygonal mirror 21 has a peripheral surface that deflects light emitted from a light source 41 and that scans the light over the photoconductor drum 3 illustrated in FIG. 1. The polygonal mirror 21 is a flat place with a substantially regular polygonal shape (regular hexagonal shape in FIG. 3) in plan view, and includes a plurality of mirror faces on the peripheral surface.

The polygonal motor 26 rotates the polygonal mirror 21 about a shaft 27. While being rotationally driven by the polygonal motor 26, the polygonal mirror 21 deflects emitted light and scans the light toward, for example, an fθ lens 43.

In order to suppress the intrusion of fine dust particles into the light scanning device 1, the light scanning device 1 is sealed or taped between the housing body 11 and the cover member 18. However, due to reasons to be described below, the shielding properties of the housing 10 have to be further enhanced.

With the demands for increasing the speed of an image forming process in recent years, it is demanded that the rotation speed of a polygonal mirror be increased, as compared with products in the related art. The polygonal mirror 21 installed in the light scanning device 1 produces an airflow as a result of high-speed rotation. Then, air flows through places where the seal member is bonded or through small continuously-connected gaps, possibly causing the air to flow from inside to outside in a certain place and from outside to inside in another place.

The air flowing into the housing 10 from the outside often contains fine dust particles that contaminate optical components. The faster the polygonal mirror 21 rotates, the more likely the fine dust particles may enter the housing 10 and possibly adhere to the surfaces of the optical components or to the housing 10.

In particular, fine dust particles contained in air flowing around the polygonal mirror 21 tend to adhere to the reflective faces of the polygonal mirror 21 rotating at high speed. Moreover, the rotation of the polygonal mirror 21 causes air turbulence to occur near the mirror faces of the polygonal mirror 21, and the airflow carrying the fine dust particles strikes intensely against the mirror faces. As a result, the fine dust particles colliding with the mirror faces of the polygonal mirror 21 accumulate thereon and thus contaminate areas of the mirror faces that receive a large amount of the airflow, thus causing the reflectivity of the contaminated areas to decrease. As the reflectivity decreases, the amount of light beam guided to the photoconductor drum 3 decreases, thus leading to a problem of reduced density of an image to be output.

In contrast, the light scanning device 1 according to this embodiment is provided with an interior section 10A not exposed to the outside of the housing 10 and an exposed section 10B exposed to the outside, and these sections are separated from each other by separators, thereby suppressing the intrusion of fine dust particles.

In detail, the housing body 11 substantially has a flat box shape with a closed bottom and has side plates 13 extending vertically upward from outer edges of a bottom plate 12. As illustrated in FIG. 2, the light scanning device 1 is provided with the exposed section 10B at one of the corners of the housing 10. The exposed section 10B is not covered with the cover member 18 and is exposed to the outside of the housing 10. In the housing 10, the area excluding the exposed section 10B is covered with the cover member 18 and is not exposed to the outside. Accordingly, the housing 10 includes the interior section 10A covered with the cover member 18 and the exposed section 10B not covered with the cover member 18.

In this embodiment, the cover member 18 substantially has a shape in which a part corresponding to the exposed section 10B of the housing 10 is cut out, attaching the cover member 18 to the housing body 11, the interior section 10A is closed and the exposed section 10B is exposed to the outside. The exposed section 10B is provided so as to be visually recognizable from the outside.

FIG. 3 illustrates a state where the cover member 18 is removed from the housing body 11. The exposed section 10B is defined by outer sidewalls 14 serving as part of the side plates 13 of the housing body 11 and by an inner sidewall 15 provided in the housing body 11. The inner sidewall 15 extends inward continuously from one of the side plates 13 of the housing body 11. One surface of the inner sidewall 15 faces the exposed section 10B, whereas the other surface faces the interior section 10A. The substrate 22 is disposed in the housing body 11 so as to extend astride both the interior section 10A and the exposed section 10B of the housing 10.

As illustrated in FIG. 4, the substrate 22 includes a first region 22A disposed in the interior section 10A of the housing 10 and a second region 22B disposed in the exposed section 10B. The first region 22A of the substrate 22 is set at one longitudinal end of the substrate 22, and the second region 22B is set at the other longitudinal end. The polygonal mirror 21 is mounted in the first region 22A of the substrate 22. The connector 28 is mounted in the second region 22B. The connector 28 is connected to a harness (not illustrated), such as a power feed line or a signal line, extending from, for example, a control device.

Separators

In the substrate 22, separators (31 and 32) are provided between the first region 22A and the second region 22B so that the two regions are separated from each other. The separators suppress the flow of air from the exposed section 10B to the interior section 10A and also inhibit the intrusion of fine dust particles between the exposed section 10B and the interior section 10A. Each separator used may be an elastic member having elasticity, electrical insulation properties, and sealability, and may be composed of a synthetic-resin-based material, a rubber-based material, or foam.

As illustrated in FIG. 4, a first face 23 of the substrate 22 is provided with a first elastic member 31 as a separator. The first elastic member 31 has a substantially rectangular prismatic shape that is contactable with the first face 23 of the substrate 22.

The first elastic member 31 is provided closer toward the connector 28 on the substrate 22 so that the first region 22A is larger than the second region 22B. Accordingly, the polygonal mirror 21 mounted in the first region 22A of the substrate 22 is disposed away from the second region 22B.

The substrate 22 is provided with a plurality of screw holes 25 used for fixing the substrate 22 to the housing body 11. As illustrated in FIG. 3, the bottom plate 12 of the housing body 11 is provided with bosses 17 in correspondence with the screw holes 25. The substrate 22 is attached to the housing body 11 by using the bosses 17.

With the bottom plate 12 of the housing body 11 being provided with the bosses 17, the substrate 22 does not come into contact with the bottom plate 12 of the housing body 11. In other words, a gap is formed between the bottom plate 12 and a second face 24 (i.e., a face opposite the first face 23) of the substrate 22 attached to the bottom plate 12.

As illustrated in FIG. 4, a second elastic member 32 is provided as a separator between the first region 22A and the second region 22B on the second face 24 of the substrate 22. Accordingly, the first region 22A and the second region 22B are separated from each other between the bottom plate 12 of the housing body 11 and the substrate 22, and the aforementioned gap is blocked. The second elastic member 32 is provided below the first elastic member 31 with the substrate 22 interposed therebetween.

The first elastic member 31 and the second elastic member 32 that are provided in contact with the substrate 22 are fixed to a pair of recesses 16 provided in the housing body 11.

As illustrated in FIG. 3, the housing body 11 is provided with the pair of recesses 16 facing each other in the inner surfaces of the inner sidewall 15 and one of the outer sidewalls 14 that define the exposed section 10B. The first elastic member 31 provided on the first face 23 of the substrate 22 has its widthwise edges supported by these recesses 16, so as to be non-movable in the housing body 11.

As illustrated in FIG. 5, a width w of each of the recesses 16 corresponds to the thickness of the first elastic member 31, and the first elastic member 31 is given a width that causes the first elastic member 31 to be in close contact with the recesses 16. Furthermore, the first elastic member 31 has a size such that the upper edge thereof protrudes upward to a position higher than the upper ends of the recesses 16.

Moreover, as illustrated in FIG. 4, the second elastic member 32 is provided with cutouts 33 for fitting the recesses 16 therein. As illustrated in FIG. 4, the second elastic member 32 has a size such that a large area thereof is contactable with the second face 24 of the substrate 22.

As illustrated in FIG. 7, the second elastic member 32 is disposed by engaging the cutouts 33 with the recesses 16 in the housing body 11. In this embodiment, the second elastic member 32 has a size such that, when fitted to the recesses 16, the second elastic member 32 extends astride both the exposed section 10B and the interior section 10A. The second elastic member 32 is positioned by fitting the recesses 16 to the cutouts 33 and is non-movable in the housing body 11.

As described above, with regard to the interior section 10A of the housing 10, the substantially-box-shaped housing body 11 with the upper opening and the closed bottom is covered with the substantially-flat cover member 16. As illustrated in FIGS. 6 and 7, the second elastic member 32 is accommodated in the housing body 11 by bringing the bottom plate 12 of the housing body 11 into contact with the second face 24 of the substrate 22 and engaging the cutouts 33 with the recesses 16.

The substrate 22 is fitted between the pair of recesses 16 that face each other. The substrate 22 is placed on the second elastic member 32 and is fixed to the bottom plate 12 by using the screw holes 25. With the substrate 22 being fixed to the bottom plate 12, the second elastic member 32 is brought into pressure contact with the second face 24 of the substrate 22, and the gap between the bottom plate 12 and the second face 24 is blocked.

The first elastic member 31 is fitted to the pair of recesses 16 and is disposed in contact with the first face 23 of the substrate 22. Accordingly, the second elastic member 32, the substrate 22, and the first elastic member 31 are provided in the housing body 11 in that order from the bottom plate 12.

The cover member 18 covers the upper edge of the first elastic member 31. The cover member 18 is fastened to the housing body 11 by using the fasteners 19 so that the first elastic member 31 is brought into pressure contact with the cover member 18 and is compressed between the substrate 22 and the cover member 18. Accordingly, the first elastic member 31 and the second elastic member 32 are disposed in close contact with the substrate 22, so that the interior section 10A and the exposed section 10B of the housing 10 are hermetically sealed off and separated from each other.

The first elastic member 31 and the second elastic member 32 as the separators may each be formed of a rubber-based material, such as neoprene rubber, polyurethane rubber, or silicone rubber. In particular, the two separators may be formed of neoprene rubber.

In the tight scanning device 1, the separators formed of such a rubber-based material are disposed in a compressed state between the substrate 22 and the inner surface of the housing 10 (i.e., the recesses 16 and the bottom plate 12 of the housing body 11 or the cover member 18). Accordingly, the separators can inhibit the flow of air around the substrate 22 disposed astride the interior section 10A and the exposed section 10B of the housing 10 and can suppress the intrusion of mine dust particles.

Therefore, when the interior section 10A of the housing body 11 is covered with the cover member 18 in the light scanning device 1, a process for connecting the harness to the connector 28 can be readily performed, and the intrusion of fine dust particles can be suppressed over a long period of time without the shielding properties at the housing 10 being adversely affected by the connection process.

Other Embodiments

In addition to the above-described embodiment, the light scanning device 1 and the image forming apparatus 100 according the present disclosure may be implemented in accordance with other alternative embodiments. For example, as an alternative to the above-described embodiment, the light scanning device 1 may be configured to use an electroluminescence (EL) or light-emitting diode (LED) write head having light-emitting elements arranged in an array. In the substrate 22 provided in the light scanning device 1, various types of electronic components, such as an integrated circuit (IC) chip, may be mounted in the second region 22B as an alternative to the connector 28.

Furthermore, in the above-described embodiment, the first elastic member 31 is provided as a separator on the first face 23 of the substrate 22, and the second elastic member 32 is provided as a separator on the second face 24. Alternatively, the separators used may be of various types in terms of the shape and the material. For example, similar to the first elastic member 31, the second elastic member 32 may have a substantially rectangular prismatic shape, and the opposite widthwise edges thereof may be supported by the recesses 16 of the housing body 11.

The material used for forming the separators may be a single rubber-based material, such as neoprene rubber, or may include two or more different materials. Moreover, the separators may each be a single layer or may be multiple layers of elastic members of the same type or different types. Therefore, the above-described embodiment is exemplary and is not limitative.

The present disclosure is applicable to an image forming apparatus and a light scanning device equipped in the image forming apparatus.

The present disclosure contains subject matter related to that disclosed in Japanese Priority Patent Application JP 2017-247868 filed in the Japan Patent Office on Dec. 25, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light scanning device comprising:
a housing;
a cover member; and
a light deflecting unit that is provided in the housing and that deflects and scans light from a light source,
wherein the housing includes an interior section covered with the cover member and not exposed to an outside of the housing and an exposed section uncovered with the cover member and exposed to the outside,
wherein the light deflecting unit includes a polygonal mirror and a substrate having a first face on which the polygonal mirror is mounted,
wherein the substrate includes a first region that is disposed in the interior section and in which the polygonal mirror is mounted and a second region disposed in the exposed section, and
wherein a separator that separates the interior section and the exposed section from each other is provided between the first region and the second region of the substrate.

2. The light scanning device according to claim 1, wherein the second region of the substrate is provided with a connector that receives a control signal for controlling the polygonal mirror.

3. The light scanning device according to claim 1, wherein the separator includes a first elastic member that comes into contact with the first face of the substrate.

4. The light scanning device according to claim 3, wherein the housing is provided with a recess that supports the first elastic member.

5. The light scanning device according to claim 1, wherein the housing includes a housing body, the cover member being operable and closable relative to the housing body, and
wherein the cover member is attached in a state where the cover member covers the separator while exposing the exposed section.

6. The light scanning device according to claim 1, wherein the separator includes a second elastic member that comes into contact with a second face of the substrate that is opposite the first face.

7. The light scanning device according to claim 1, wherein the separator is formed of neoprene rubber.

8. The light scanning device according to claim 1, wherein the separator is disposed in a compressed state between the substrate and the housing.

9. An image forming apparatus comprising:
the light scanning device according to claim 1.

* * * * *